Sept. 1, 1931. H. E. BIRKHOLZ 1,821,202
RENEWABLE CAPSULE FILTER
Filed Aug. 10, 1927 2 Sheets-Sheet 1

Inventor:
Hans E. Birkholz.
Rummler & Rummler
Attys.

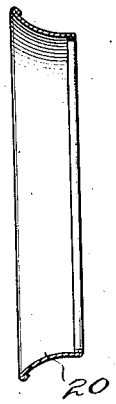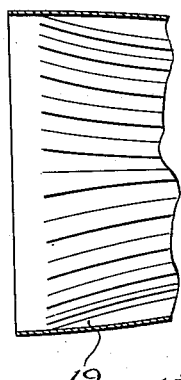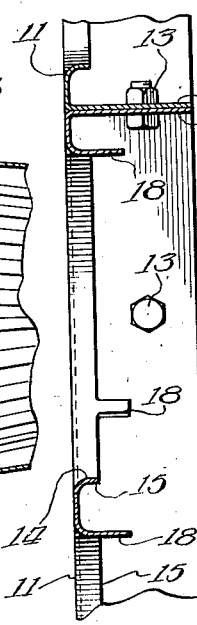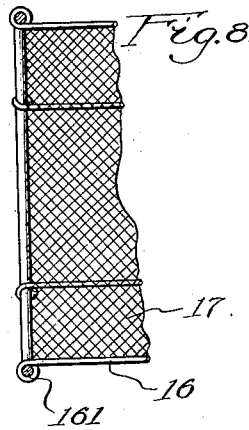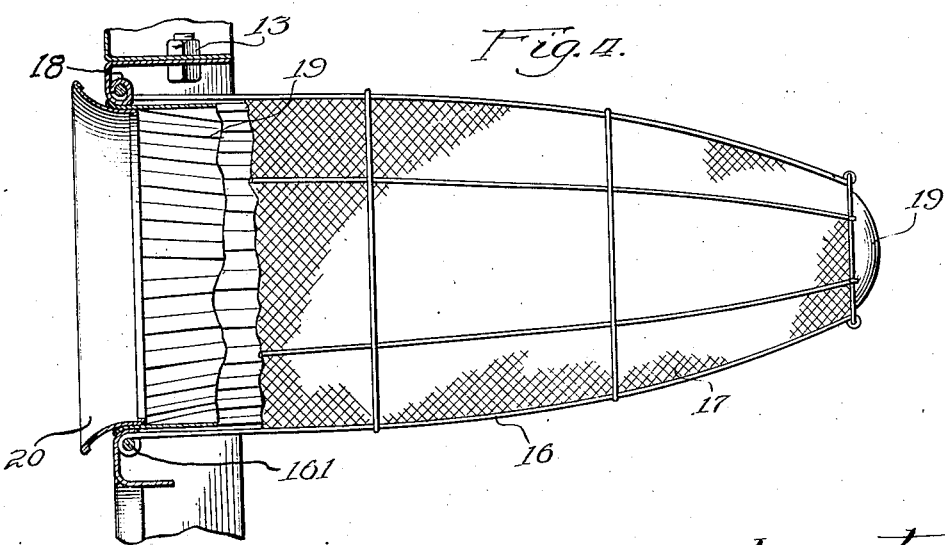

Patented Sept. 1, 1931

1,821,202

UNITED STATES PATENT OFFICE

HANS E. BIRKHOLZ, OF CHICAGO, ILLINOIS, ASSIGNOR, BY MESNE ASSIGNMENTS, TO AMERICAN AIR FILTER COMPANY, INC., OF LOUISVILLE, KENTUCKY, A CORPORATION OF DELAWARE

RENEWABLE CAPSULE FILTER

Application filed August 10, 1927. Serial No. 211,947.

This invention relates to improvements in air and gas filters, and more particularly to the readily renewable filtering means thereof.

Heretofore, in the more common installations of air cleaners, the filtering means consisted of loose filtering masses packed in trays, or of moving foraminated belts. Since oil was used for cleaning, the filtering material was necessarily of a metallic composition, and the impingement of the air against wet surfaces was depended upon for separating the foreign particles from the air or gas. An appreciable velocity through the filtering mass was therefore required, which made the unit resistance of the filter quite high and required considerable power for moving the air since the power is a function of the square of the velocity.

Such filters were difficult to clean, expensive to construct, were quite bulky and usually required special construction in the building, as well as expert care and attention, and careful designing. The filters were also affected by the prevailing temperatures; if placed near the heating coils, the oil vapor was entrained in the air, and in the winter the oil would not function.

The main objects of this invention are to provide means for obtaining clean air at a low installation and operating expense. A true filter action is obtained by using a cheaply replaceable filtering medium which consists of a paper or paper-like fibrous material in a honeycomb arrangement with spaced, paper walled cells, closed at the bottom. A great area of filtering surface is obtained; and the individual cells are made of cups which are removably mounted in suitably apertured partition which extends across the air passage. The partition or cell supporting plate is built up of uniform, flanged sheet metal sections which are standardized as to size and form so that they can be produced at a low cost and may be readily assembled to fit the various sizes and shapes of air conduits.

An illustrative embodiment of the invention is shown in the accompanying drawings in which:

Fig. 4 is an enlarged section of one of the filtering cells.

Figures 5, 6, 7 and 8 are individual views of the parts shown in Fig. 4, separated and placed in their relative positions for assembling, showing the retainer ring, the end of the filtering cup, a section of the partition plate, and the end of the supporting basket respectively.

Figure 1:
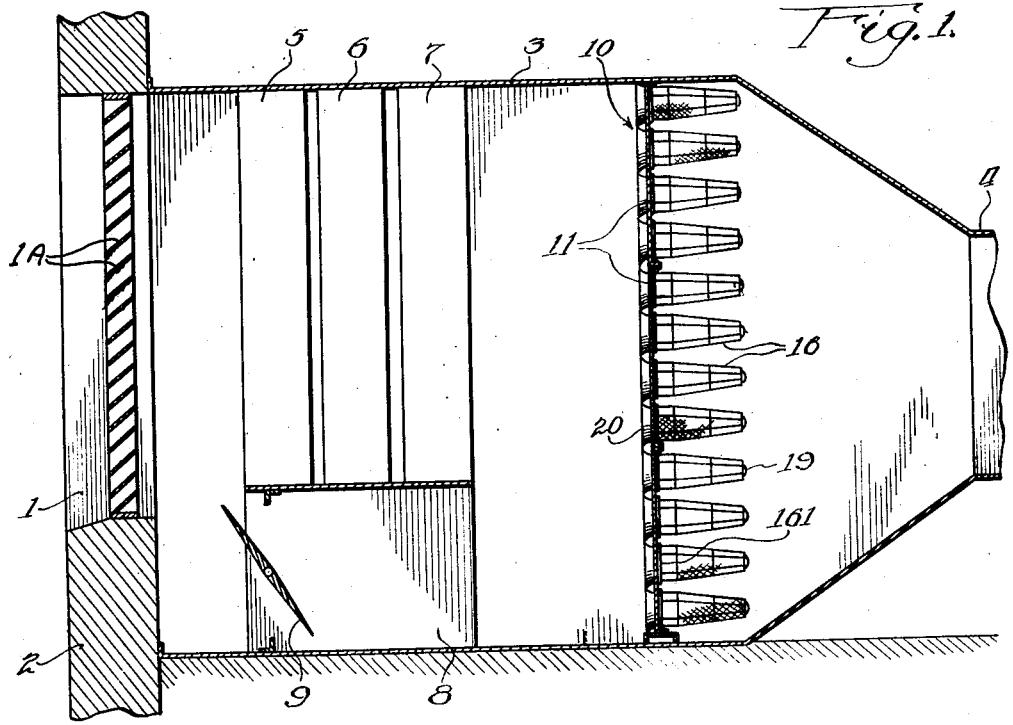
Fig. 1 is a longitudinal vertical section of the air cleaner.
Figure 2:
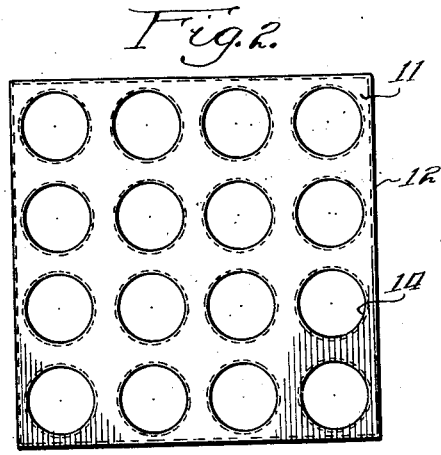
Fig. 2 is a face view of one of the sheet metal plates of which the filtering partition of the air cleaner shown in Fig. 1, is composed.
Figure 3:
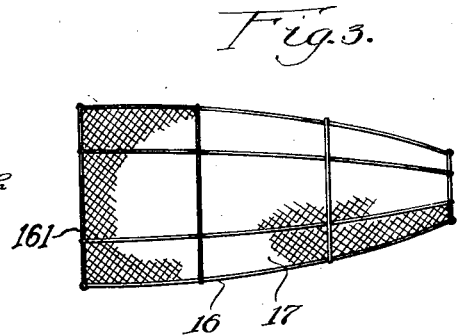
Fig. 3 is an enlarged view of one of the supporting baskets which are secured over the apertures of the plates.

Referring to the drawings, the air cleaning means is installed at the intake aperture 1 in the wall 2 of the building. A sheet metal housing 3 is provided which fits over the aperture 1 at one end, and is reduced at the inner or opposite end to join the air distributing conduit 4, which may be provided with a fan or other well known means for drawing the air through the cleaner. A louvre section of inclined and metallic plates 1a is mounted across the inlet aperture to remove the entrained moisture; and means for heating the air, if required, are provided in the frames 5, 6 and 7 which are mounted in the housing 3 in alternate relation with a by-pass 8 which is controlled by means of a damper 9.

Across the inner end of the housing is mounted the filtering partition or cell supporting wall 10 which is composed of a plurality of sheet metal plates 11. The number of plates used will of course vary with size and capacity of the unit. The plates 11 are provided with marginal right-angled flanges 12, so that bolts 13 may be passed through registering holes in the flanges of the adjacent plates, as shown in Fig. 4 and Fig. 7 to secure the plates together. Holes 14 are cut through the face of the plate and the marginal edges of the plate around the holes are provided with short flanges 15 which are struck out of the metal in the plate.

Over each hole is provided a basket having a wire frame 16, with a ring 161 at one end, and the frame is wound or covered with wire screening 17. Short lugs 18 are left standing on the edges of the flanges 15 which are bent around the ring 161 for retaining the basket in position.

Paper cups 19, for filtering the air, are inserted in the pockets formed by the baskets, and are held in position by means of belled retainer rings 20 which are pressed into the holes 14 when the cups are in position so as to grip the peripheral edge of the cup between the ring 20 and the flange 15. The material of the cups is pervious to the flow of the air, and the walls are preferably corrugated or fluted to increase the effective filtering surface.

The baskets re-enforce the walls of the cups so that a considerable depression for drawing the air may be used, without breaking the walls of the cups. Since a large filtering area is provided, the cups may be used for a long period of time before their efficiency is lost. Then, since the material is relatively inexpensive, the cups may be easily removed by withdrawing the rings 20, the cups discarded and replaced with fresh cups. The loss of pressure through the filtering means is very low, and high velocities are not required, although they may be used.

The units may be installed at very low cost in practically any ordinary ventilating or air conditioning system. No oil or other cleaning medium is required and the air is thoroughly purified and deodorized.

While but one specific embodiment of this invention has been herein shown and described, it will be understood that details of the construction shown may be altered or omitted without departing from the spirit of this invention, as defined by the following claims:

I claim:

1. In an air cleaner, a sheet metal plate having an aperture formed therein, with a flange around the aperture, the flange having protuberant tongues, a wire basket having a ring in one end set over the flange, the tongues being bent around said ring for retaining said basket.

2. In an air cleaner, filtering means comprising a plate having an aperture therethrough, a flange on said plate around the aperture, a basket mounted on the outer side of the flange, and a filtering bag extending through said aperture into the basket and engaging the inner side of the flange for retaining the bag in a concentric relation with the basket.

3. In an air cleaner, a sheet metal plate having an aperture formed therein, with a flange around the aperture, the flange having protuberant tongues, a wire basket comprising spaced rings joined together by spaced ribs, one of said rings being set over the flange and the tongues being bent around the ring for retaining the basket in position.

4. In an air cleaner, filtering means comprising a plate having an aperture therein, a flange on the plate around the aperture, a basket permanently mounted on the outer side of the flange, and a filter bag removably mounted on the inner side of the flange adapted to be removed and replaced without necessitating the removal of the basket.

Signed at Chicago this 6th day of August, 1927.

HANS E. BIRKHOLZ.